J. P. MAHONEY.
AUTOMOBILE BRAKE.
APPLICATION FILED SEPT. 26, 1918.
1,313,103.
Patented Aug. 12, 1919.
2 SHEETS—SHEET 1.
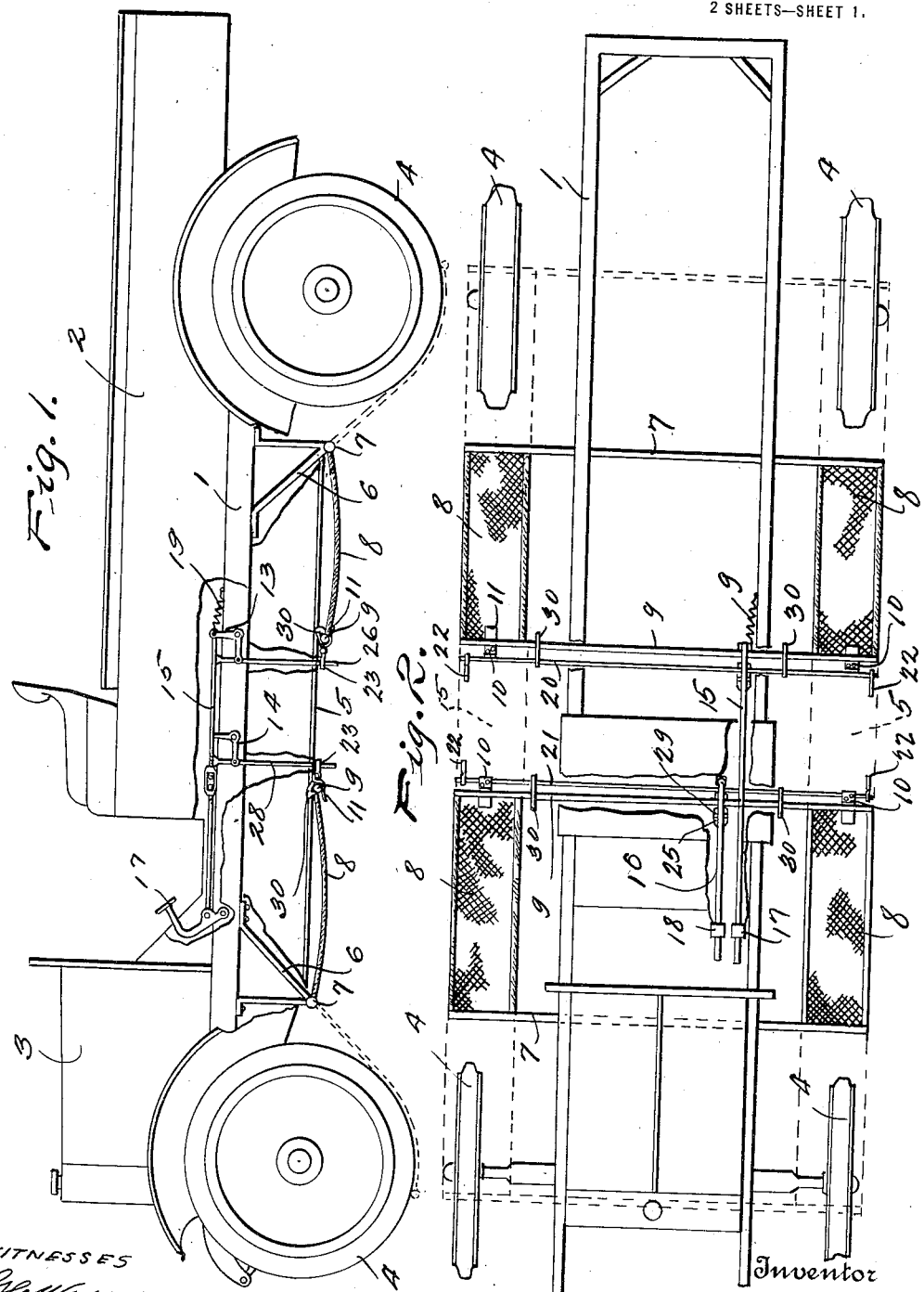
WITNESSES
Inventor
Joseph P. Mahoney J. P. MAHONEY.
AUTOMOBILE BRAKE.
APPLICATION FILED SEPT. 26, 1918.
1,313,103.
Patented Aug. 12, 1919.
2 SHEETS—SHEET 2.
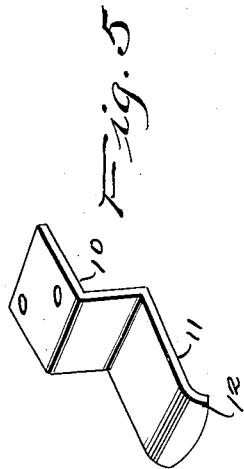
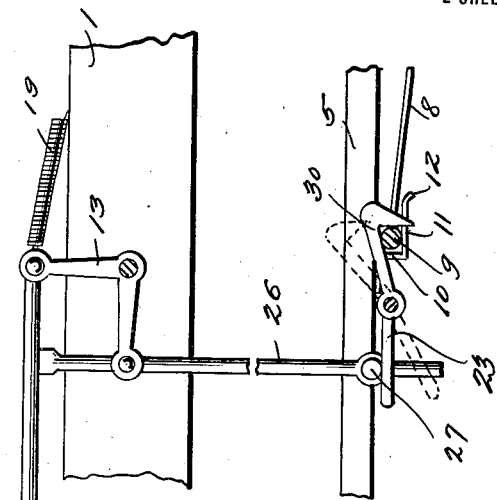
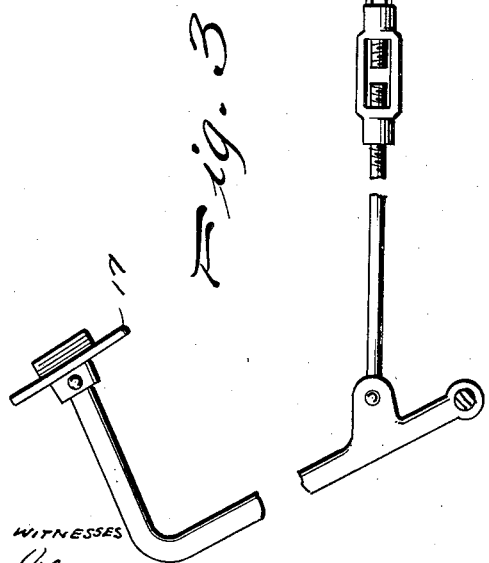
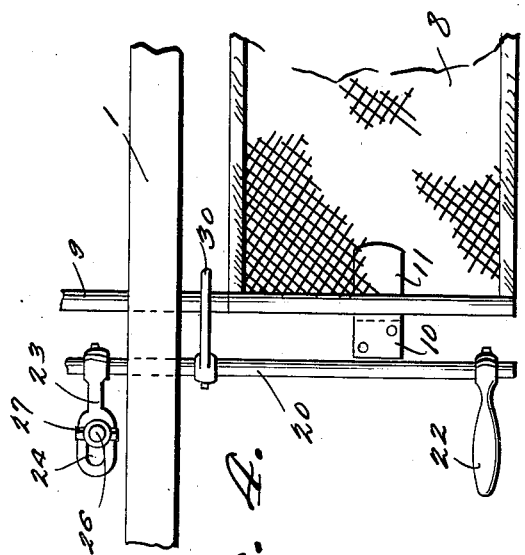
Inventor
Joseph P. Mahoney
By Richard Owen,
Attorney
WITNESSES

UNITED STATES PATENT OFFICE.

JOSEPH P. MAHONEY, OF SALT LAKE CITY, UTAH.

AUTOMOBILE-BRAKE.

1,313,103.   Specification of Letters Patent.   Patented Aug. 12, 1919.

Application filed September 26, 1918. Serial No. 255,794.

*To all whom it may concern:*

Be it known that I, JOSEPH P. MAHONEY, a citizen of the United States, residing at Salt Lake City, in the county of Salt Lake and State of Utah, have invented certain new and useful Improvements in Automobile-Brakes, of which the following is a specification.

My invention relates to new and useful improvements in an automobile brake and more particularly to an emergency automobile brake.

The principal object of the invention is the provision of an emergency brake which may be readily connected to the automobile and which may be easily operated when the regular brakes of the automobile do not properly hold.

Another object is the construction of an emergency brake in such a manner that it will be normally held in such a position as to present a neat appearance and will not mar the general outline of the automobile.

A further object resides in means for releasing the brake so that it may engage beneath the wheel to stop the rotation thereof.

A still further object resides in the provision of means for operating the emergency brake either by foot power or by hand.

With these and other objects in view my invention consists of the novel details of construction and arrangement of parts which which will be more clearly understood from the following specification and drawings in which:

Figure 1 is a side elevation, partly in section, showing my emergency brake in position and the manner of operating the same.

Fig. 2 is a top plan view of the automobile frame, parts broken away, to illustrate the position of the emergency brake when not in use.

Fig. 3 is a detailed view of the brake releasing mechanism with part of the automobile frame removed.

Fig. 4 is a detailed top plan showing the means of releasing the emergency brake and the means for holding the same in inoperative position, and Fig. 5 is a perspective detail of the clamp or plate for holding the brake in raised position.

In the drawings the numeral 1 indicates the main frame of the automobile supporting the body 2, the hood 3, and the other working parts of the machine. The frame is supported upon the wheels 4 and the running board is indicated at 5. Of course it will be understood that the parts so far described are those now commonly in use and form no part of the present invention.

Brackets 6, more particularly illustrated in Fig. 1 of the drawings, are secured to the under side of each side member of the frame 1 and rods 7 are rotatably supported in said brackets and the ends of the rods extend beyond each side of the frame 1 as more particularly illustrated in Figs. 2 and 4 of the drawings. These rods 7 are each preferably of such a length as to extend beneath the running board 5 and each terminates in alinement with the outer edge of said running board. My emergency brake shoe is indicated at 8 and is preferably constructed of wire or other suitable mesh fabric. Each of the brake shoes 8 is preferably of such a width as to lie beneath the running board as particularly indicated in Figs. 1 and 2 of the drawings. A rod 9 is connected to the outer ends of the brake shoes 8 and such rod is preferably the same length as the rod 7 previously described.

Clamping plates 10, more particularly illustrated in Fig. 5 of the drawings are secured on the underside of the running board 5 and each plate is adapted to receive the rod 9 between the under side of the running board and the spring arm 11 thereof. The end of the spring arm 11 is preferably turned downwardly as indicated at 12 whereby the rod 9 may be easily slipped over said spring arm and be securely held in position. As more particularly illustrated in Fig. 2 of the drawings two of these clamp plates are secured to each of the running boards and those clamp plates on each board extend in opposite direction and away from one another. As is clearly illustrated in the drawings the rear brake shoe is pivotally connected to the bracket adjacent the rear wheel and the free end held up adjacent the central portion of the running board. The front brake shoe is hingedly connected adjacent the front wheel and the free end thereof is supported adjacent the free end of the rear brake shoe as is more particularly illustrated in Figs. 1 and 2 of the drawings. Bell crank levers 13 and 14 are pivotally connected to one side member of the frame 1 and the bell crank lever 13 has a rod 15 secured to the upper end thereof and the bell crank lever 14 has a similar rod 16 secured to the upper end thereof. A foot lever 17 is pivotally connected to the automobile body and to the forward end of the rod 15 and a similar foot lever 18 is connected to the automobile body and to the forward end of the rod 16. Coil springs 19 are secured to the automobile frame and to each of the bell crank levers 13 and 14 for normally holding the parts in operative position.

Longitudinally spaced rods 20 and 21 are rotatably mounted beneath the frame 1 and running board 5 in any suitable manner and each of these rods 20 and 21 is provided with a hand lever 22 on each end thereof. These hand levers 22 preferably lie beneath the running board as more particularly illustrated in Fig. 2 of the drawings. The rod 20 is provided intermediate its ends with an arm 23 having an elongated opening 24 therein the purpose of which will be presently described. The rod 21 is provided with a similar arm 25 having an elongated opening, the same as the arm 23 but not shown in the drawings. A vertical rod 26 is connected to the lower end of the bell crank lever 13 and the lower end thereof is adapted to pass through the elongated opening 24 in the arm 23. The upper end of the rod 26 is adapted to lie beneath the rod 15 and a cross pin 27 extends through the lower end of the rod as more particularly illustrated in Fig. 4 of the drawings, and is adapted to rest upon the top of the arm 23 and over the elongated opening 24. A similar vertical rod 28 is secured to the lower arm of the bell crank lever 14 and the upper end thereof will rest beneath the rod 16. The lower end of the vertical rod 28 passes through the elongated opening in the arm 25 and is provided with a pin 29 adapted to extend over the top of said arm.

Each of the rods 20 and 21 is further provided with a hook catch indicated at 30 which is normally adapted to engage over the rods 9 and hold them in position beneath the running board and in engagement with the spring clamp plate 10. As more particularly illustrated in Fig. 2 of the drawings there are two of these catches on each of the rods and are adapted to engage the rod 9 between the side of the main frame and the brake shoe.

In Fig. 3 of the drawings I have illustrated in detail, the parts connected to the rear brake shoes and the means for operating the same but it will be understood that the parts for operating and holding the front brake shoes are of the same construction and that the operation in releasing each of them will be the same.

From the above detailed description it is thought that the advantages and mode of operation will be clearly understood. When not in use the several parts of my device will be in the position illustrated in the drawings and, as previously stated, the brake shoes 8 will be held beneath the running board 5 of the automobile. By this construction the brake shoes are held out of sight so that the appearance of the automobile will not be in any way marred. Should it be desired to use the rear brake shoes the foot lever 17 is pressed downwardly and this pulls forward on the rod 15 which in turn swings the bell crank lever 13 and lowers the rod 26. The cross pin 27 will push downwardly upon the arm 23 which will turn the rod 20 thereby raising the hook catch 30 and allowing the rod 9 to drop downwardly. The weight of the rod will throw the shoe toward the rear wheel and said wheel in revolving will engage the rod and draw the shoe therebeneath as is clearly illustrated in dotted lines in Fig. 1 of the drawings. It will readily be seen that the shoes beneath the wheel will form a brake therefor and stop the sliding of the machine. The coil spring 19 will draw the parts to their normal position, when the foot lever 17 is released, and when the brake shoe is to be again raised the parts will be placed back into their original position. While I have described the operation for the rear brake shoe it will be understood that the operation will be the same for lowering the front shoes beneath the front wheels. When the front shoes are to be dropped the foot lever 18 is pressed upon and this will pull on the rod 16 and the bell crank lever 14 to lower the rod 28 which releases the hook catch member from the rod 9 and allows the same to drop.

It will be seen that I have provided an emergency brake which will securely hold the wheel, when the main brakes of the automobile refuse to operate.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claims.

Having fully described my invention what I claim as new and desire to secure for Letters Patent is:

1. An automobile brake comprising brake shoes hingedly connected to the automobile, a rod rotatably mounted on the automobile, an arm connected to said rotatable rod and provided with an elongated opening, a hook catch connected to said rotatable rod and adapted to engage the brake shoe for holding the same in raised position, a vertical rod extending through the elongated opening in the arm, and means for sliding said vertical rod for rotating the rotatable rod and releasing the catch from the brake shoe.

2. An automobile brake comprising brake shoes hingedly connected to the automobile, a rod rotatably mounted on the automobile adjacent the end of the brake shoes, an arm connected to said rotatable rod and provided with an elongated opening, a hook catch carried by the rotatable rod and adapted to engage the brake shoe for holding the same in raised position, a vertical rod having one end extending through the elongated opening in the arm, a transverse pin extending through the rod and engaging the arm, and means for sliding the rod for rotating the rotatable rod and releasing the catch from the brake shoe.

3. An automobile brake comprising transversely spaced brake shoes hingedly connected to the automobile, a rod connecting the ends of the brake shoes, a rod rotatably mounted in the automobile adjacent the rod connecting the brake shoes, an arm connected to said rotatable rod and provided with an elongated opening, a hook catch connected to the rotatable rod and adapted to engage the rod connecting the brake shoes for holding them in raised position, a vertical rod having its lower end extending through the slot in the arm on the rotatable rod, a transverse pin passing through the vertical rod and engaging the top of the arm, a bell crank lever pivotally connected to the automobile frame and having its lower arm connected to the vertical rod, a horizontal rod connected to the upper end of the bell crank lever, and a foot lever pivotally connected to the opposite end of the horizontal rod.

4. An automobile brake comprising flexible brake shoes hingedly connected to the automobile, a rod connecting the ends of the brake shoes, spring catches connected to the automobile running board for receiving the rods connecting the brake shoes, a rotatable rod mounted adjacent the rod connecting the brake shoes, an arm secured to the rotatable rod and provided with an elongated opening, a hook catch secured to the rotatable rod and adapted to engage the rod connecting the brake shoes, a vertical rod having its lower end extending through the opening in the arm, a transverse pin carried by the vertical rod for engaging the arm, a bell crank lever pivotally connected to the automobile frame and having its lower arm connected to the vertical rod, a horizontal rod connected to the vertical arm of the bell crank lever, a foot lever connected to the opposite end of the horizontal rod, and a coil spring connected to the automobile frame and to the vertical arm of the bell crank lever.

In testimony whereof I affix my signature in presence of two witnesses.

JOSEPH P. MAHONEY.

Witnesses:
   THOS. SIMPSON,
   C. E. HANSEN.